US005277022A

United States Patent [19]

Shekleton et al.

[11] Patent Number: 5,277,022

[45] Date of Patent: Jan. 11, 1994

[54] AIR BLAST FUEL INJECTON SYSTEM

[75] Inventors: Jack R. Shekleton, San Diego; Michael W. Sledd, Vista, both of Calif.

[73] Assignee: Sundstrand Corporation, Rockford, Ill.

[21] Appl. No.: 966,903

[22] Filed: Oct. 23, 1992

Related U.S. Application Data

[63] Continuation of Ser. No. 542,733, Jun. 22, 1990, abandoned.

[51] Int. Cl.[5] ........................ F23R 3/32; F02C 7/22

[52] U.S. Cl. ........................ 60/39.36; 60/737; 60/738; 60/743

[58] Field of Search ................ 60/734, 737, 738, 740, 60/743, 39.36, 739, 756, 758, 760, 759; 239/423, 424, 432, 523, 533.14; 123/531; 431/403, 424

[56] References Cited

U.S. PATENT DOCUMENTS

| | | | |
|---|---|---|---|
| 3,099,134 | 7/1963 | Calder et al. | 60/752 |
| 3,968,644 | 7/1976 | Fehler | 60/746 |
| 4,549,402 | 10/1085 | Samtsbury et al. | 60/760 |
| 4,928,481 | 5/1990 | Joshi et al. | 60/760 |
| 4,967,563 | 11/1990 | Shekleton | 60/743 |

FOREIGN PATENT DOCUMENTS

| | | |
|---|---|---|
| 2203023 | 5/1974 | France . |
| WO89/05903 | 6/1989 | PCT Int'l Appl. . |

*Primary Examiner*—Richard A. Bertsch
*Assistant Examiner*—Timothy S. Thorpe
*Attorney, Agent, or Firm*—Wood, Phillips, VanSanten, Hoffman & Ertel

[57] ABSTRACT

In order to enhance fuel injection efficiency, and particularly to atomize low fuel flows at high velocity with low fuel pressure, a fuel injection system 24 for a combustor 22 of a turbine engine 20 has an air blast tube 48 and a fuel supply tube 76. The air blast tube 48 is mounted at an acute angle relative to a wall 26 of the combustor 22 and has a first end 50 in communication with the combustor 22 and a second, enlarged end 52 disposed at an acute angle to an axis 54 of the air blast tube 48 in communication with a source of compressed air externally of the wall 26 of the combustor 22. The air blast tube 48 is operable to deliver compressed air from the source into the combustor 22. The fuel supply tube 76 delivers fuel through a fuel supply orifice 58 to a point at or near the first end 50 of the air blast tube 48 and has a first end 60 in communication with the combustor 22 through the fuel supply orifice 58 and a second end 62 in communication with a source of fuel externally of the wall 26 of the combustor 22. With this arrangement, the fuel supply tube 76 extends to a point communicating internally with the air blast tube 48 but adjacent a discharge opening 64 of the air blast tube 48 to produce an enhanced atomized fuel/air mixture thereby.

43 Claims, 4 Drawing Sheets

AIR BLAST FUEL INJECTON SYSTEM

This application is a continuation of application Ser. No. 542,733, filed Jun. 22, 1990, now abandoned.

FIELD OF THE INVENTION

The present invention is directed to a fuel injection system and, more particularly, a fuel injection system for a combustor of a turbine engine.

BACKGROUND OF THE INVENTION

Generally speaking, there have been a number of significant improvements in the field of fuel injection in recent years. This is particularly true in the case of fuel injection systems for combustors of turbine engines wherein, for certain applications, it has been proposed to utilize tangential or semi-tangential injection by means of impingement surfaces located within tangentially directed air blast tubes. In this connection, this particular fuel injector utilizes what has become known as impingement fuel pressure atomization.

While considerably more efficient than swirl pressure atomization, there are nonetheless certain well recognized problems. These include the wide variety of operating conditions which can be encountered, i.e., low altitude operation which typically requires higher fuel flows and high altitude operation which requires very low fuel flows. Because of this inverse relationship between altitude and fuel flow, there has been a need to develop a fuel injection system that is highly versatile.

As mentioned hereinabove, one successful proposal has included utilizing tangential injection by means of impingement surfaces located within tangentially directed air blast tubes. This impingement fuel pressure atomization has represented a significant improvement for certain applications but, nonetheless, can suffer from certain deficiencies, particularly where it is desirable to mount the fuel injection system in the dome of the combustor. Because of the geometry of a turbine engine, it is essentially impossible to mount the fuel supply passage in an air blast tube in order to provide tangential or semi-tangential injection.

Because of this fact, fuel injection systems have typically been characterized by less efficient atomization in applications that require one or more dome-mounted injectors. This, in turn, is a problem in terms of efficiency as well as operation under the wide variety of operating conditions that can be encountered in practical applications. Furthermore, the absence of efficient atomization in combustors has resulted in undesirable amounts of smoke emissions therefrom.

In the case of smaller turbine engines, the exit diameter of the air blast tube is also proportionately reduced. Thus, on engines for smaller auxiliary power units, which can be, by way of example, on the order of as low as 50 horsepower, any significant blockage of the flow of compressed air through the air blast tube is not acceptable since the diameter of the tube carrying the fuel supply passage must remain relatively constant. While the number of injectors can be minimized to maximize the diameter of the air blast tubes, the problem nevertheless remains.

The present invention is directed to overcoming one or more of the foregoing problems and achieving one or more of the resulting objects.

SUMMARY OF THE INVENTION

It is a principal object of the present invention to provide a fuel injection system for a combustor of a turbine engine. It is also an object of the present invention to utilize a combination of impingement pressure injection and air blast injection to enhance fuel injection efficiency. Furthermore, it is an object of the present invention to provide a fuel injection system capable of atomizing low fuel flows at high velocity with low fuel pressures.

Accordingly, the present invention is directed to a fuel injection system for a combustor of a turbine engine having an air blast tube mounted at an acute angle relative to a wall of the combustor. The fuel injection system also includes fuel supply means for delivering fuel through a fuel supply orifice to a point at or near the first end of the air blast tube. With this arrangement, the air blast tube has a first end in communication with the combustor and a second, enlarged end disposed at an acute angle to an axis of the air blast tube.

In addition, the air blast tube is in communication with a source of compressed air externally of the wall of the combustor and is operable to deliver compressed air from the source into the combustor. The fuel supply means also has a first end in communication with the combustor through the fuel supply orifice and a second end in communication with a source of fuel externally of the wall of the combustor. The fuel supply means extends to a point communicating internally with the air blast tube but adjacent a discharge opening of the air blast tube. In several distinct embodiments, the fuel injection system includes impingement surface means positioned in the path of fuel discharged from the fuel supply means to produce a fuel spray directed into the path of compressed air.

More specifically, the impingement surface means is preferably adapted to produce a fuel spray directed into the path of compressed air discharged through the discharge opening of the air blast tube at a point internally of the air blast tube. The impingement surface means causes the fuel spray and compressed air to interact within the combustor to produce an atomized fuel/air mixture. Still further, the discharge opening of the air blast tube advantageously lies in a plane disposed generally perpendicular to an axis of the air blast tube and disposed so as to intersect the wall of the combustor.

With this arrangement, the fuel supply means is preferably defined by a fuel supply tube defining a fuel supply passage having the fuel supply orifice therein.

As for the air blast tube, it preferably has a generally cylindrical wall which is secured to the wall of the combustor in such a manner as to be disposed at an acute angle thereto. Also, the air blast tube advantageously has an opening through the generally cylindrical wall thereof whereby the fuel supply tube can extend into the generally cylindrical wall of the air blast tube. As for the discharge opening of the air blast tube, it preferably has an outermost point adjacent the wall of the combustor and a diametrically opposed innermost point.

With this arrangement, the opening through the generally cylindrical wall is preferably axially spaced relative to the outermost point of the discharge opening of the air blast tube. In one embodiment, the generally cylindrical wall of the air blast tube includes a fuel supply entry tube leading to the opening through the wall of the air blast tube. As for this embodiment, the fuel supply entry tube is dimensioned slightly larger than the fuel supply tube to provide an air gap to facilitate insertion of the fuel supply tube into the fuel supply entry tube.

When the generally cylindrical wall of the air blast tube includes a fuel supply entry tube, the fuel supply tube terminates at the generally cylindrical wall of the air blast tube in closely spaced relation to the outermost point of the discharge opening in one embodiment. The fuel supply tube may then also advantageously include a finger comprising the impingement surface means wherein the finger faces the fuel supply tube to produce a fuel spray directed into the path of compressed air discharged through the discharge opening of the air blast tube. Alternatively, when the generally cylindrical wall of the air blast tube includes a fuel supply entry tube, the fuel supply tube terminates at the centerline of the air blast tube at or near the outermost point of the discharge opening of the air blast tube in another embodiment.

In the latter embodiment, the fuel injection system can also include a finger facing the fuel supply tube to produce a fuel spray directed into the path of compressed air discharged through the discharge opening of the air blast tube. Alternatively, the fuel supply tube can be scarfed at the centerline of the air blast tube. With a scarfed fuel supply tube, the fuel supply orifice is advantageously disposed within the fuel supply tube at a point upstream of where it is scarfed to form a terminal end generally coinciding with the centerline of the air blast tube.

When the fuel supply tube extends to the centerline of the air blast tube, the first end of the air blast tube at the discharge opening preferably has a wake reducing constriction in the generally cylindrical wall thereof. This wake reducing constriction is advantageously located at a position inwardly of the combustor. Still additionally, the second end of the air blast tube preferably has a compressed air receiving outward flare in the generally cylindrical wall at a position outwardly of the combustor.

In yet another embodiment utilizing a fuel supply entry tube, the fuel supply entry tube terminates at or near the centerline of the air blast tube at or near the outermost point of the discharge opening of the air blast tube. Then, a finger is advantageously formed integrally with the fuel supply entry tube. With this arrangement, the finger formed integrally with the fuel entry supply tube faces the fuel supply tube to produce a fuel spray directed into the path of compressed air discharged through the air blast tube.

In a highly preferred embodiment, the turbine engine includes a combustor case spaced from the wall of the combustor. At least one locating boss can then advantageously be secured to the wall of the combustor adjacent the air blast tube. Further, a pin can extend from the locating boss and be secured to the combustor case for connecting the combustor case to the wall of the combustor.

Preferably, the pin is formed to have a fuel passageway comprising the fuel supply means for the fuel injection system. The air blast tube, as with other embodiments, will then advantageously have a generally cylindrical wall disposed at an acute angle to the wall of the combustor and will also advantageously have an opening therethrough. Preferably, the locating boss will surround the opening in the generally cylindrical wall of the air blast tube and the pin will extend through the locating boss.

Additionally, the generally cylindrical wall of the air blast tube can include a fuel supply entry tube leading through the opening in the generally cylindrical wall of the air blast tube. The fuel supply entry tube can then advantageously terminate at or near the centerline of the air blast tube at or near the outermost point of the discharge opening of the air blast tube and a pin can include a fuel supply tube defining the fuel passageway therewithin and extending from the pin to extend into the fuel supply entry tube. With this arrangement, a finger is also advantageously formed integrally with the fuel supply entry tube in such a manner as to face the fuel supply tube to thereby produce a fuel spray.

In yet another embodiment of the invention, the combustor case includes means for securing the fuel supply tube thereto. The fuel supply tube then advantageously extends from the combustor case into the air blast tube generally axially of the air blast tube to a point adjacent the discharge opening thereof. With this arrangement, the air blast tube preferably includes means for supporting the fuel supply tube at an axially remote location from the combustor case.

As for the supporting means, it preferably includes a centering tube supported by a strut along the centerline of the air blast tube. The fuel supply tube is then disposed within the centering tube in sliding relationship thereto. Further, means are provided for maximizing the distance between the centering tube and the securing means to minimize stress on the fuel supply tube.

As for the distance maximizing means, it preferably includes a recess in the combustor case axially of the air blast tube. The securing means then is advantageously disposed within the recess in the combustor case axially remote from the air blast tube. In addition, the centering tube is preferably disposed within the air blast tube axially remote from the securing means and the recess in the combustor case.

Preferably, the fuel supply tube will extend into the air blast tube generally axially of the air blast tube to a point adjacent the discharge opening thereof. It may also advantageously include impingement surface means positioned in the path of fuel discharged from the fuel supply tube to produce a fuel spray directed into the path of compressed air discharged through the discharge opening of the air blast tube. With this arrangement, the fuel supply tube preferably terminates on the centerline of the air blast tube at a point at or near the discharge opening thereof.

As with the other embodiments, the finger facing the fuel supply tube preferably produces a fuel spray directed into the path of compressed air and preferably at an acute angle of up to approximately 90°.

In the latter embodiment, the supporting means preferably includes a centering tube supported by a strut along the centerline of the air blast tube. The fuel supply tube is then advantageously disposed within the centering tube in sliding relationship thereto. With this arrangement, a finger may be formed integrally with the centering tube to face the fuel supply tube to produce the fuel spray.

Other objects, advantages and features of the present invention will become apparent from a consideration of the following specification taken in conjunction with the accompanying drawings.

DETAILED DESCRIPTION OF THE PREFERRED EMBODIMENTS

Figure 1:
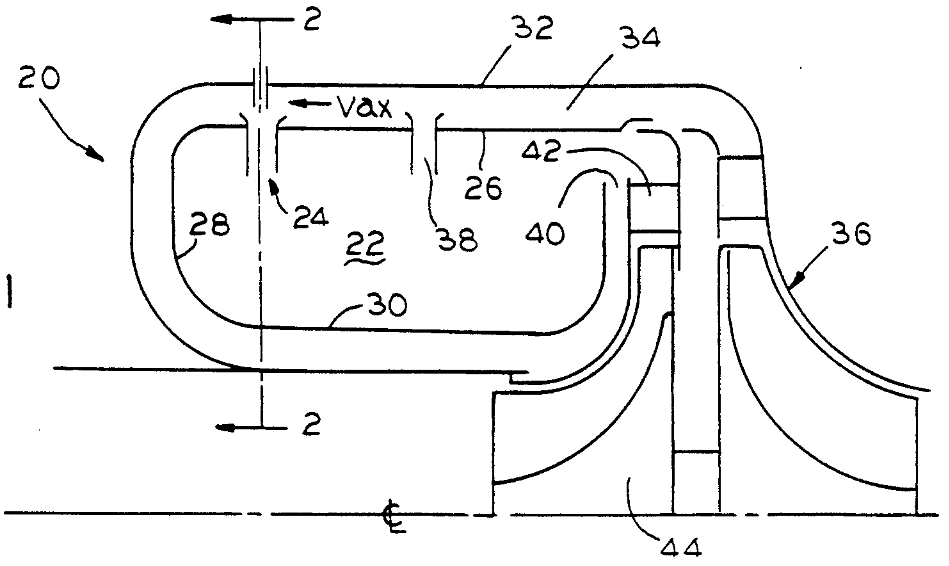
FIG. 1 is a cross-sectional view of a turbine engine having a combustor with a fuel injection system in accordance with the present invention.

Referring to the drawings, and first to FIG. 1, the reference numeral 20 designates generally a turbine engine having a combustor 22 with a fuel injection system 24. The turbine engine 20, shown merely for purposes of illustration, is of the radial reverse flow type and includes an outer combustor wall 26, a combustor dome 28, and an inner combustor wall 30 surrounded by a combustor casing 32 defining an air flow path 34 extending from a compressor generally designated 36. With this arrangement, compressed air can flow from the compressor 36 through the compressed air flow path 34 substantially entirely about the combustor 22.

Figure 2:
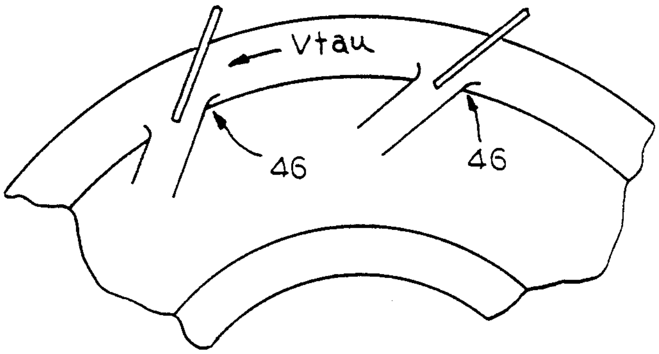
FIG. 2 is a generally schematic cross-sectional view taken along the line 2—2 of FIG. 1.

In the illustrated turbine engine 20, a dilution air inlet 38 is provided in the outer combustor wall 26 an a dilution air discharge opening 40 is provided adjacent a turbine nozzle 42. It will be seen and appreciated that the turbine nozzle 42 leads to a turbine 44. As for the fuel injection system 24, it will typically include a plurality of circumferentially spaced fuel injectors 46 illustrated very schematically in both of FIGS. 1 and 2.

As for the present invention, it will be appreciated that it is directed to a number of different embodiments of fuel injection systems. These fuel injection systems comprise injectors which all have in common an air blast tube and fuel supply means which together comprise a unique and improved arrangement for a combustor of a turbine engine. In this connection, the fuel injection system 24 is equally applicable to a wide variety of different types of turbine engines.

Figure 3:
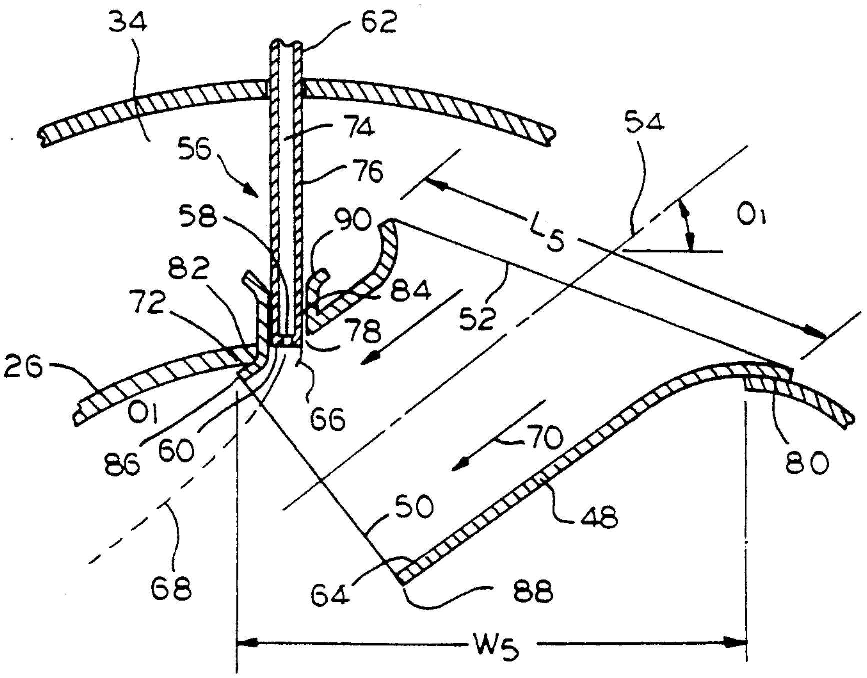
FIG. 3 is a cross-sectional view illustrating a first embodiment of the fuel injection system of the invention.

Referring now to FIG. 3, the fuel injection system 24 includes an air blast tube 18 mounted at an acute angle $\theta$ relative to a wall 26 of the combustor 22. The air blast tube 48 has a first end 50 in communication with the combustor 22 and a second, enlarged end 52 disposed at an acute angle $\theta_1$ to an axis 54 of the air blast tube 48. As shown, the second end 52 is in communication with the compressed air flow path 34 externally of the outer combustor wall 26 of the combustor 22. With this arrangement, the air blast tube 48 is operable to deliver compressed air from the compressor 36 into the combustor 22 while fuel supply means generally designated 56 is provided for delivering fuel through a fuel supply orifice 58. It will be seen that the fuel supply orifice 58 is located at a point at or near the first end 50 of the air blast tube 48. As shown in FIG. 3, the fuel supply means 56 has a first end 60 in communication with the combustor 22 through the fuel supply orifice 58 and a second end 62 in communication with a source of fuel externally of the outer combustor wall 26.

Still referring to FIG. 3, the fuel supply means 56 extends to a point communicating internally with the air blast tube 48 but adjacent a discharge opening 64 of the air blast tube 48. It will also be seen that, in the embodiment illustrated in FIG. 3, the fuel injection system 24 includes impingement surface means in the form of a finger 66 positioned in the path of fuel discharged from the fuel supply means 56 to produce a fuel spray as indicated at 68 which is directed into the path of compressed air discharged through the discharge opening 64 of the air blast tube 48 as indicated at 70. As will be appreciated, the fuel spray 68 enters the path of compressed air 70 at a point internally of the air blast tube 48 to cause an interaction within the combustor 22 to produce an efficiently atomized fuel/air mixture.

As will be appreciated by referring to FIG. 3, the discharge opening 50 of the air blast tube 48 lies in a plane disposed generally perpendicular to the axis 54 of the air blast tube 48 and intersecting the outer combustor wall 26 as at 72. It will also be seen that the fuel supply means 56 includes a fuel supply passage 74 having the fuel supply orifice 58 therein. With the arrangement as illustrated in FIG. 3, the fuel supply passage 74 is defined by a fuel supply tube 76 extending to a point 78 communicating internally with the air blast tube 48 but adjacent the discharge opening 50 thereof.

Still referring to FIG. 3, the air blast tube 48 has a generally cylindrical wall disposed at the acute angle $\theta$ to the outer combustor wall 26. The air blast tube 48 is secured to the outer combustor wall 26, for instance, as at 80 and 82 and has an opening 84 through the generally cylindrical wall thereof. As will be appreciated, the fuel supply tube 76 extends into the opening 84 in the generally cylindrical wall of the air blast tube 48.

In the embodiment illustrated in FIG. 3, the discharge opening 50 of the air blast tube 48 has an outermost point 86 adjacent the outer combustor wall 26 and an innermost point 88 diametrically opposite the outermost point 86 thereof. It will also be seen that the opening 84 through the generally cylindrical wall is axially spaced relative to the outermost point 86 of the discharge opening 50 of the air blast tube 48 and, in the FIG. 3 embodiment, the generally cylindrical wall of the air blast tube 48 includes a fuel supply entry tube 90 leading to the opening 84 through the generally cylindrical wall of the air blast tube 48. With this arrangement, the fuel supply entry tube 90 is dimensioned slightly larger than the fuel supply tube 76 to provide an air gap to facilitate insertion of the fuel supply tube 76 into the fuel supply entry tube 90.

As shown in FIG. 3, the fuel supply tube 76 terminates at the generally cylindrical wall of the air blast tube 48 in closely spaced relation to the outermost point 86 of the discharge opening 84 of the air blast tube 48. It will also be seen that, as previously mentioned, a finger 66 faces the fuel supply tube 76 to produce the fuel spray as at 68 which is directed into the path of compressed air as at 70 being discharged through the discharge opening 50 of the air blast tube 48. In this manner, the fuel supply means 56 directs the fuel spray as at 68 into the air blast tube 48 just upstream of the discharge opening 50 to interact with the compressed air to produce an atomized fuel/air mixture.

Figure 4:
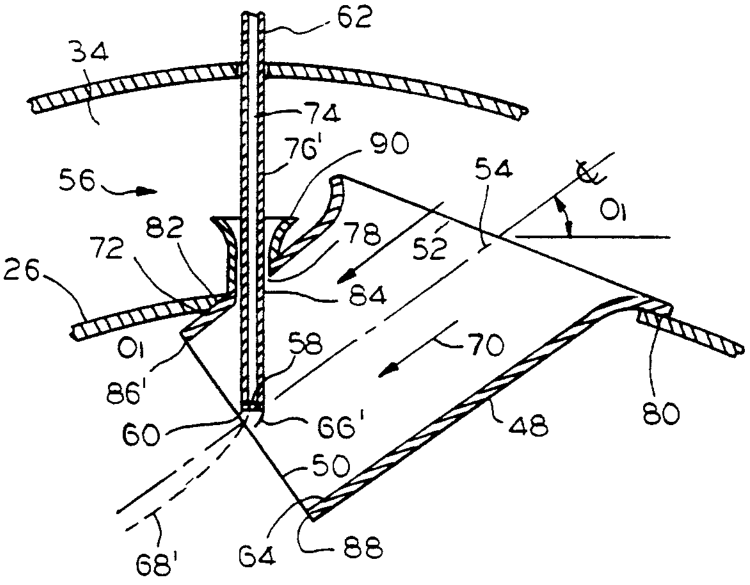
FIG. 4 is a cross-sectional view illustrating a second embodiment of the fuel injection system of the present invention.

Referring to FIG. 4, another embodiment of fuel injection system 24 has been illustrated and, this embodiment is substantially identical to the embodiment illustrated in FIG. 3. As a result, it will be seen that like reference numerals designate like components in both of FIGS. 3 and 4. In fact, the only differences are in the location of the outermost point 86' of the discharge opening 50 of the air blast tube 48 relative to the outer combustor wall 26 and the length of the fuel supply tube 76'.

As shown in FIG. 4, the fuel supply tube 76' terminates at the centerline 54 of the air blast tube 48 at or near the discharge opening 50. It still passes through the fuel supply entry tube 90 and the opening 84 in the generally cylindrical wall of the air blast tube 48, and it includes a finger 66' very similar to the finger 66 in FIG. 5 but angled slightly differently so as to produce a fuel spray 68' directed generally in a direction coincident with the centerline 54 of the air blast tube 48 so as to be central of the compressed air discharged from the air blast tube 48 after it passes along the compressed air flow path as at 70. As with the embodiment illustrated in FIG. 4, the fuel spray as at 68' and the compressed air interact within the combustor 22 to produce an efficiently atomized fuel/air mixture.

Figure 5:
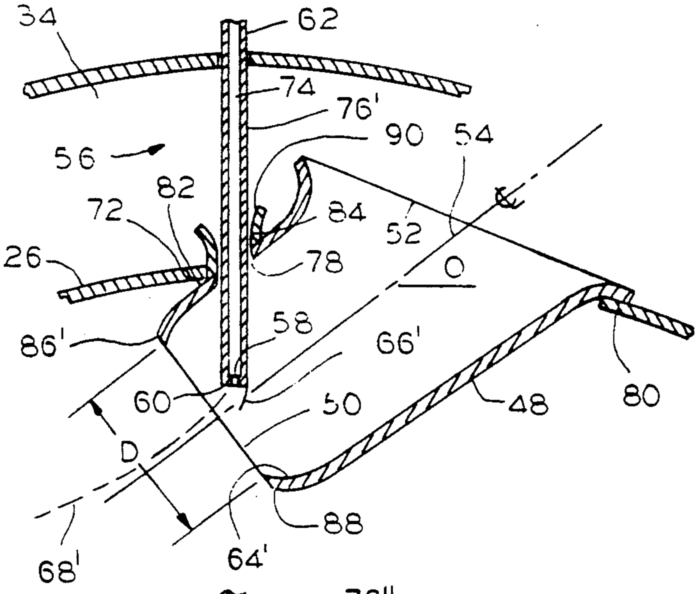
FIG. 5 is a cross-sectional view illustrating a third embodiment of the fuel injection system of the present invention.

Referring to FIG. 5, another embodiment of fuel injection system 24 is illustrated. This embodiment is very similar to the embodiment illustrated in FIG. 4 and, thus, like components will bear identical reference numerals. As for the differences, they will be described in some detail.

As shown in FIG. 5, the fuel supply tube 76' once again terminates at the centerline 54 of the air blast tube 48, but the first end 50 of the air blast tube 48 has a narrowed discharge opening 64' comprising a wake reducing constriction in the generally cylindrical wall of the air blast tube 48. More specifically, the narrowed discharge opening 64, is located at a position inwardly of the combustor 22 while the second end 52 of the air blast tube 48 has a compressed air-receiving outward flare outwardly of the combustor 22 identical to that in the embodiments of FIGS. 3 and 4.

In all other respects, the embodiment illustrated in FIG. 5 is identical to that of FIG. 4 and, thus, the outermost point 86' again extends inwardly of the combustor outer wall 26. It will also be seen that the fuel supply tube 76' again extends to the centerline 54 of the air blast tube 48, and the finger 66' is disposed at an angle so as to direct the fuel spray as at 68' in a direction generally coincident with the centerline 54 of the air blast tube 48. However, with the narrowed discharge opening 64' and the air blast tube 48, there is a reduction of wake that otherwise would be present by reason of the extension of the fuel supply tube 76'.

Figure 6:
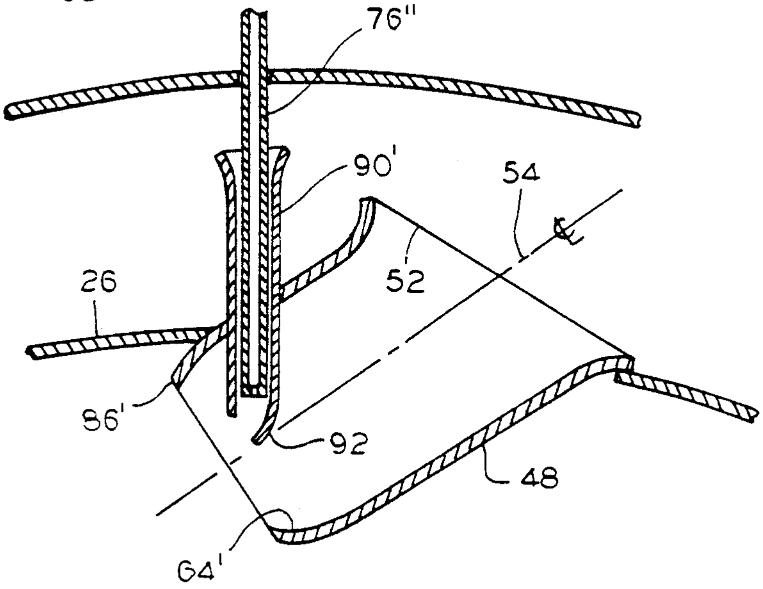
FIG. 6 is a cross-sectional view illustrating a fourth embodiment of the fuel injection system of the present invention.

Referring now to FIG. 6, still another embodiment of the fuel injection system 24 is illustrated. This embodiment is quite similar to that illustrated in FIG. 5 and, thus, like components will again be identified by like reference numerals. In this embodiment, the principal difference is in the form of the fuel supply entry tube 90'.

More specifically, the fuel supply entry tube 90' terminates at or near the centerline 54 of the air blast tube 48 at a point at or near the discharge opening 64' of the air blast tube 48. A fuel supply tube 76" extends to a point slightly recessed within the fuel supply entry tube 90' but without a finger such as 66' in FIG. 5 associated therewith. In contrast, a finger 92 is formed integrally with the fuel entry supply tube 90' to face the fuel supply tube 76" at a point substantially at the centerline 54 of the air blast tube 48.

As with the prior embodiment illustrated in FIG. 5, the outermost point 86' of the discharge opening 64' is positioned inwardly of the combustor outer wall 26. It will also be seen from FIG. 6 that the discharge opening 64' forms a wake reducing constriction to assist in overcoming the interference otherwise caused by the presence of the fuel entry supply tube 90' and the second, enlarged end 52 is outwardly flared to provide an excellent aerodynamic inlet which is in communication with the compressed air flow path 34. Of course the fuel entry supply tube 90' easily accommodates the insertion and removal of the fuel supply tube 76" to assist in serviceability.

Figure 7:
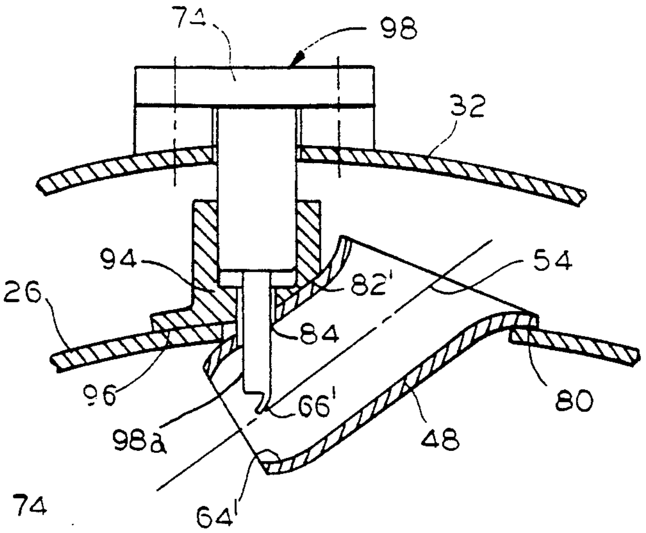
FIG. 7 is a cross-sectional view illustrating a fifth embodiment of the fuel injection system of the present invention.

Referring to FIG. 7, yet another embodiment of the fuel injection system is illustrated. It, too, bears certain significant similarities to the embodiment illustrated in FIG. 5 and, again, like components will bear identical reference numerals. As for the differences, they will be discussed in detail hereinafter.

Specifically, a locating boss 94 is secured to the combustor outer wall 26 as at 96 adjacent to the air blast tube 48, and a pin generally designated 98 extends from the locating boss 94 and is secured to the combustor case 32. This arrangement serves to connect the combustor case 32 to the combustor outer wall 26, i.e., it serves to provide a very secure and rigid interconnection therebetween, and the pin 98 is formed to have a fuel passageway 74 therethrough as illustrated. As will be appreciated, the locating boss 94 surrounds the opening 84 in the generally cylindrical wall of the air blast tube 48, and the pin 98 has a narrowed portion 98a extending through the locating boss 94 and the opening 84.

In this embodiment, the narrowed portion 98a of the pin 98 extends generally to the centerline 54 of the air blast tube 48. It also extends to a point at or near the discharge opening 64' of the air blast tube 48. As with earlier embodiments, the narrowed portion 98a of the pin 98 has a finger 66' for producing the requisite fuel spray.

However, unlike the earlier embodiments where the air blast tube 48 was secured to the combustor outer wall 26 as at 80 and 82 (see FIG. 3), the embodiment of FIG. 7 is somewhat different. It, too, contemplates the air blast tube 48 being secured to the combustor outer wall 26 as at 80, but the air blast tube 48 is indirectly secured to the combustor outer wall 26 generally diametrically opposite thereof as at 82' where the generally cylindrical wall of the air blast tube 48 is secured to the locating boss 94. In any event, since the locating boss 94 is connected to the combustor outer wall 26 as at 96, this provides a rigid interconnection of the air blast tube 48 and combustor outer wall 26.

Figure 8:
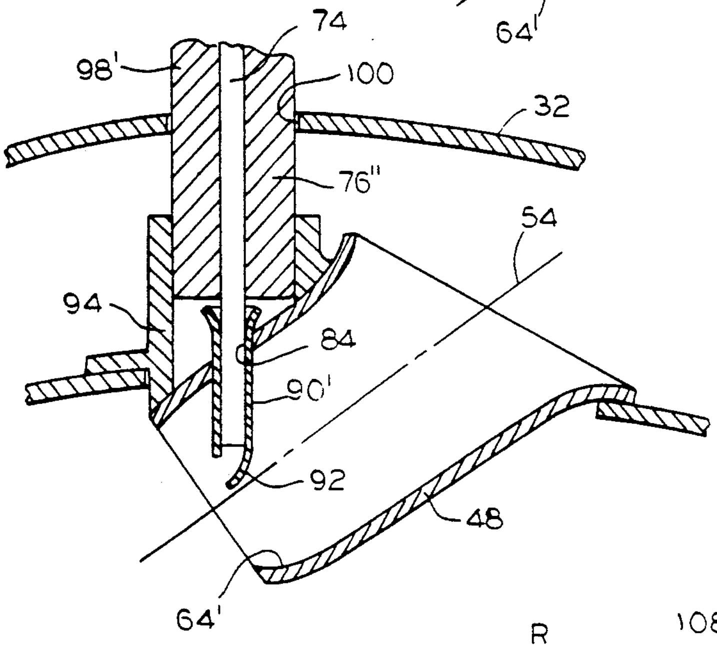
FIG. 8 is a cross-sectional view illustrating a sixth embodiment of the fuel injection system of the present invention.

Referring now to FIG. 8, still another embodiment of the fuel injection system is illustrated. This embodiment has certain similarities to the embodiment of FIG. 7 and, as such, like components will be identified by identical reference numerals. In this embodiment, the principal difference is the utilization of a fuel supply entry tube 90'.

As with the embodiment illustrated in FIG. 6, the fuel supply entry tube 90' leads through the opening 84 in the generally cylindrical wall of the air blast tube 48 and terminates at or near the centerline 54 of the air blast tube 48 at or near the discharge opening 64' thereof. The pin 98' extends from the locating boss 94 through an opening 100 in the combustor outer case 32 but, instead of an integral narrowed pin portion 98*a*, the pin 98' includes an integral fuel supply tube 76" such as that illustrated in FIG. 6. As will be appreciated by referring to FIG. 6, the fuel supply tube 76" serves to define the fuel passageway 74 and it also extends from the pin 98' into the fuel supply entry tube 90' substantially as illustrated.

As with the embodiment of FIG. 6, the fuel supply entry tube 90' includes a finger 92 formed integrally therewith to face the fuel supply tube 76" to produce the requisite fuel spray.

Figure 9:
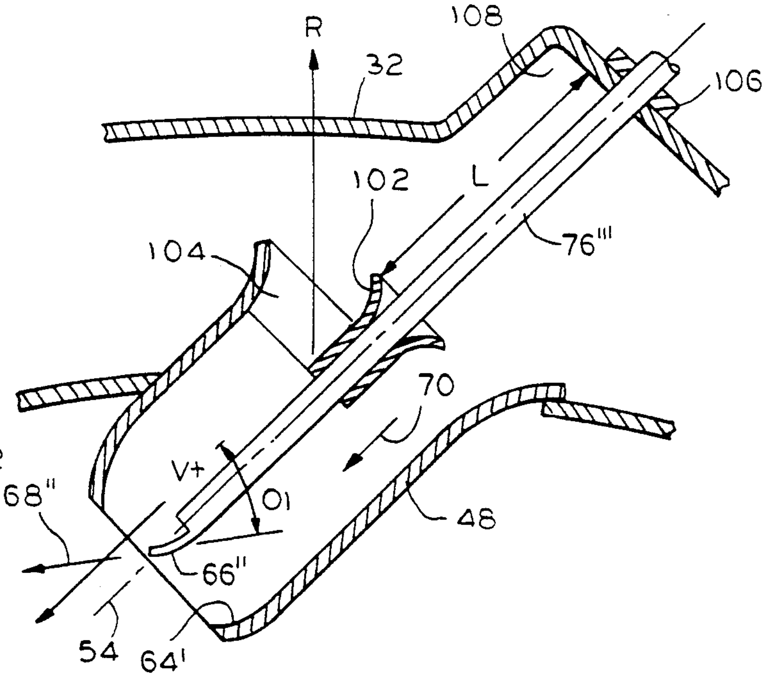
FIG. 9 is a cross-sectional view illustrating a seventh embodiment of the fuel injection system of the present invention.

Referring to FIG. 9, it will be appreciated that yet another embodiment of fuel injection system has been illustrated. It, too, has similarities to earlier embodiments and, thus, like components will bear like reference numerals. As for the differences, the principal difference will be seen to reside in the location and support for the fuel supply tube 76'''.

As shown in FIG. 9, the fuel supply tube 76''' extends to a point internally of the air blast tube 48 but adjacent the discharge opening 64' thereof. The combustor case 32 includes means for securing the fuel supply tube 76''' in the form of a centering tube 102 supported by a strut 104 integrally secured to the air blast tube 48 wherein the centering tube 102 is located along the centerline 54 of the air blast tube 48. With this arrangement, the fuel supply tube 76''' extends from the combustor case 32 into the air blast tube 48 generally axially of the air blast tube 48 to a point adjacent the discharge opening 64' thereof.

As shown in FIG. 9, the fuel supply tube 76''' is disposed within the centering tube 102 in sliding relationship thereto. It will also be seen that this embodiment includes means for maximizing the distance between the centering tube 102 and the securing means which can comprise a suitable fitting 106 secured to the combustor case 32 in a recess 108 axially of the air blast tube 48 whereby the fitting 106 is associated with the recess 108 axially remote from the air blast tube 48. As will be appreciated, the centering tube 102 is likewise disposed within the air blast tube 48 axially remote from the fitting 106 associated with the recess 108.

As shown in FIG. 9, the fuel supply tube 76''' includes a finger 66" positioned in the path of fuel discharged from the fuel supply tube 76''' to produce the requisite fuel spray. It will be seen and appreciated that the fuel supply tube 76''' terminates on the centerline 54 of the air blast tube 48 at a point at or near the discharge opening 64' such that the finger 66" faces the fuel supply tube 76''' to direct the fuel spray as at 68" into the path of compressed air as at 70 at an acute angle of up to approximately 90°. In this manner, the fuel spray as at 68" and compressed air as at 70 can interact within the combustor 22 in a manner producing a highly efficient atomized fuel/air mixture.

Figure 10:
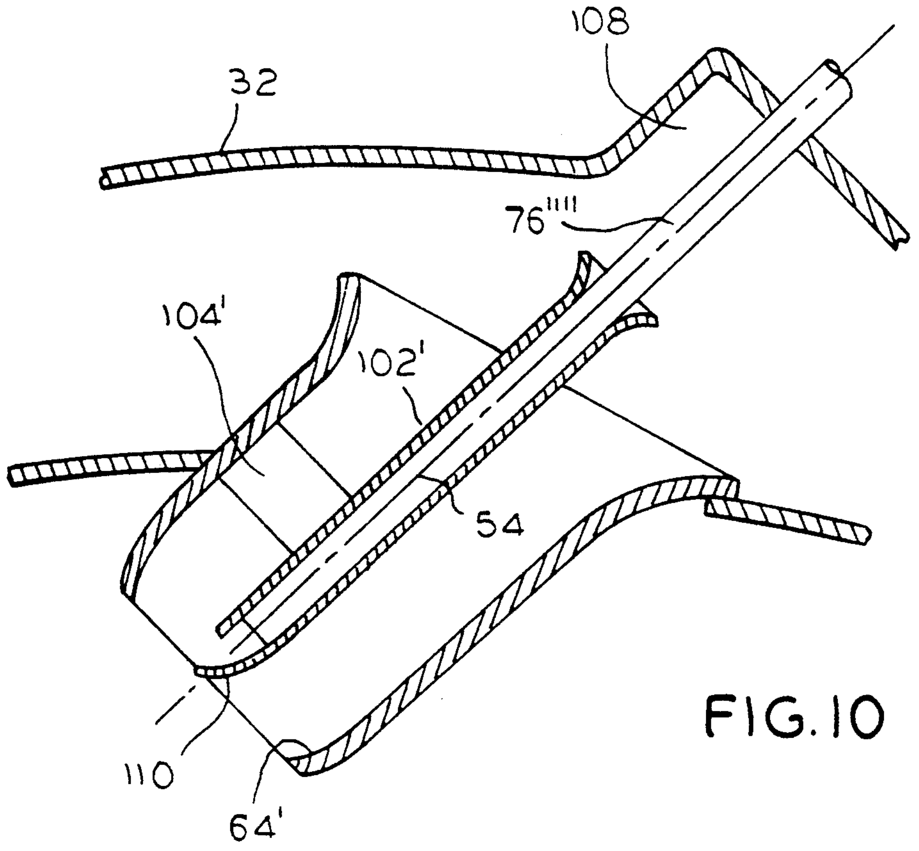
FIG. 10 is a cross-sectional view illustrating an eighth embodiment of the fuel injection system of the present invention.

Referring now to FIG. 10, it will be seen that still another embodiment of the fuel injection system 24 has been illustrated. This embodiment is very similar to the embodiment illustrated in FIG. 9 and, again, like components are identified by identical reference numerals. As for the differences, they reside principally in the centering tube 102' as well as the location of the strut 104'.

More specifically, the axially remote supporting means includes a centering tube 102' supported by a strut 104' along the centerline 54 of the air blast tube 48. The strut 104' is located at a more axially remote position from the recess 108 of the combustor case 32 and, in the embodiment illustrated in FIG. 9, the centering tube 102' is extended in length so as to approach the discharge opening 64' where it terminates remote from the recess 108 of the combustor case 32. As before, the fuel supply tube 76'''' is disposed within the centering tube 102' in sliding relationship.

In contrast to the embodiment illustrated in FIG. 9, the centering tube 102' includes a finger 110 formed integrally therewith. The finger 110 faces the fuel supply tube 76'''', i e., the fuel being discharged therefrom, to produce the requisite fuel spray. As with the embodiment of FIG. 9, the fuel spray is directed into the path of compressed air at an acute angle of up to approximately 90°.

Figure 11:
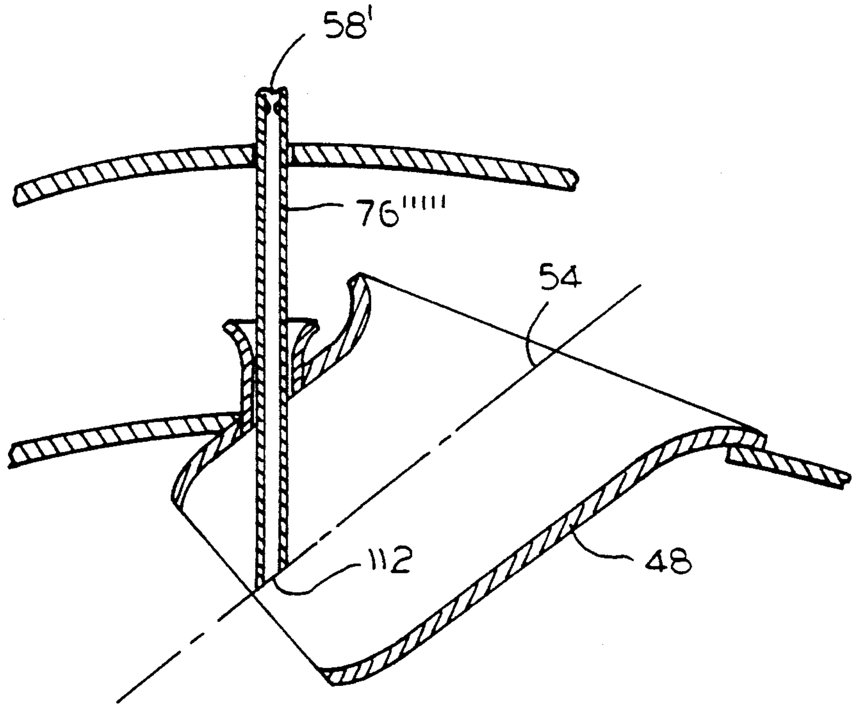
FIG. 11 is a cross-sectional view illustrating a ninth embodiment of the fuel injection system of the present invention.

Finally, referring to FIG. 11, it will be seen that yet another embodiment of fuel injection system 24 has been illustrated. This embodiment is closely related to the embodiment illustrated in FIG. 4, and, as a result, like components have been designated by like reference numerals. As for the sole difference between the two embodiments, it will be appreciated that it resides in the precise form of the fuel supply tube 76''''.

As will be appreciated, the fuel supply tube 76''''' is scarfed as at 112 at the centerline 54 of the air blast tube 48. It will also be seen that the fuel supply orifice 58' is disposed within the fuel supply tube 76''''' at a point well upstream of the point where the fuel supply tube 76''''' is scarfed. As shown in FIG. 11, the fuel supply tube 76''''' is scarfed to form a terminal end generally coinciding with the centerline 54 of the air blast tube 48.

In all of the preceding embodiments, it is possible to atomize low fuel flows at high velocity with low fuel pressures. It is also clear that the fuel injection systems illustrated are much less complex than conventional systems and lack the multiple orifices of conventional injectors. As such, the present invention has provided fuel injection systems that are far less prone to fouling.

Also, in all of the embodiments, the air blast tube is attached by appropriate means permanently to the combustor outer wall. The fuel supply means, most of which are of the impingement type, are generally attached to the combustor case so that ordinarily they can be removed. Furthermore, fuel is discharged generally at or near the discharge opening of the air blast tube.

In addition, the enlarged opening leading into the air blast tube provides a much larger flow area which, in turn, provides much better aerodynamics of entry to the air blast tube. This is particularly true when the angle of the air blast tube relative to the combustor outer wall is small. In addition, the air gap and tolerance problems that are characteristically associated with fuel injection systems have been essentially entirely eliminated by reason of the features of the present invention.

While in the foregoing there have been set forth preferred embodiments of the invention, it will be appreciated by those skilled in the art that the details herein given may be varied without departing from the true spirit and scope of the appended claims.

We claim:

1. A fuel injection system for a combustor of a turbine engine, comprising:
   - an air blast tube mounted at an acute angle relative to a wall of said combustor, said air blast tube having a first end in communication with said combustor and a second, enlarged end disposed at an acute angle to an axis of said air blast tube and in communication with a source of compressed air externally of said wall of said combustor, said air blast tube being operable to deliver compressed air from said source into said combustor; and
   - fuel supply means including a fuel supply tube for delivering fuel through a fuel supply orifice positioned at a point adjacent said first end of said air blast tube, at least a portion of said fuel supply tube being positioned within and extending through at least a portion of said air blast tube such that said fuel supply tube has a first end defining said fuel supply orifice positioned substantially at said first end of said air blast tube so as to be in communication with said combustor through said fuel supply orifice and said fuel supply tube also having a second end in communication with a source of fuel externally of said wall of said combustor, said fuel supply means thereby extending to a point communicating internally with said air blast tube but adjacent a discharge opening of said air blast tube at said first end thereof.

2. The fuel injection system of claim 1 including impingement surface means positioned in the path of fuel discharged from said fuel supply tube to produce a fuel spray directed into the path of compressed air discharged through said discharge opening of said air blast tube at a point internally of said air blast tube to cause said fuel spray and compressed air to interact within said combustor to produce an atomized fuel/air mixture.

3. The fuel injection system of claim 1 wherein said discharge opening of said air blast tube lies in a plane disposed generally perpendicular to an axis of said air blast tube and intersecting said wall of said combustor.

4. The fuel injection system of claim 1 wherein said air blast tube has a generally cylindrical wall disposed at an acute angle to said wall of said combustor, said air blast tube being secured to said wall of said combustor and having an opening through said generally cylindrical wall thereof, said fuel supply tube extending into said generally cylindrical wall of said air blast tube.

5. The fuel injection system of claim 4 wherein said discharge opening of said air blast tube has an outermost point adjacent said wall of said combustor and an innermost point diametrically opposite said outermost point thereof and said opening through said generally cylindrical wall is axially spaced relative to said outermost point of said discharge opening of said air blast tube.

6. The fuel injection system of claim 5 wherein said generally cylindrical wall of said air blast tube includes a fuel supply entry tube leading to said opening through said generally cylindrical wall of said air blast tube, said fuel supply entry tube being dimensioned slightly larger than said fuel supply tube to provide an air gap to facilitate insertion of said fuel supply tube into said fuel supply entry tube.

7. The fuel injection system of claim 6 wherein said fuel supply tube terminates at said generally cylindrical wall of said air blast tube in closely spaced relation to said outermost point of said discharge opening of said air blast tube and including a finger facing said fuel supply tube to produce a fuel spray directed into the path of compressed air discharged through said discharge opening of said air blast tube.

8. The fuel injection system of claim 6 wherein said fuel supply tube terminates at the centerline of said air blast tube at or near said discharge opening of said air blast tube and including a finger facing said fuel supply tube to produce a fuel spray directed into the path of compressed air discharged through said discharge opening of said air blast tube.

9. The fuel injection system of claim 8 wherein said fuel supply tube is scarfed at the centerline of said air blast tube, said fuel supply orifice being disposed within said fuel supply tube at a point upstream of the point where said fuel supply tube is scarfed, said fuel supply tube being scarfed to form a terminal end generally coinciding with the centerline of said air blast tube.

10. The fuel injection system of claim 8 wherein said first end of said air blast tube at said discharge opening has a wake reducing constriction in said generally cylindrical wall at a position inwardly of said combustor and said second end of said air blast tube has a compressed air receiving outward flare in said generally cylindrical wall at a position outwardly of said combustor.

11. The fuel injection system of claim 5 wherein said generally cylindrical wall of said air blast tube includes a fuel supply entry tube leading through said opening in said generally cylindrical wall of said air blast tube, said fuel supply entry tube being dimensioned slightly larger than said fuel supply tube to provide an air gap to facilitate insertion of said fuel supply tube into said fuel supply entry tube.

12. The fuel injection system of claim 11 wherein said fuel supply entry tube terminates at or near the centerline of said air blast tube at or near said discharge opening of said air blast tube and including a finger formed integrally with said fuel entry supply tube to face said fuel supply tube to produce a fuel spray directed into the path of compressed air discharged through said air blast tube.

13. The fuel injection system of claim 1 wherein said turbine engine includes a combustor case spaced from said wall of said combustor, and including at least one locating boss secured to said wall of said combustor adjacent said air blast tube, and further including a pin extending from said locating boss and secured to said combustor case for connecting said combustor case to said wall of said combustor.

14. The fuel injection system of claim 13 wherein said pin is formed to have a fuel passageway comprising said fuel supply tube, said air blast tube having a generally cylindrical wall disposed at an acute angle to said wall of said combustor and having an opening therethrough, said locating boss surrounding said opening in said generally cylindrical wall of said air blast tube and said pin extending through said locating boss.

15. The fuel injection system of claim 14 wherein said generally cylindrical wall of said air blast tube includes a fuel supply entry tube leading through said opening in said generally cylindrical wall of said air blast tube, said fuel supply entry tube terminating at or near the centerline of said air blast tube at or near said outermost point of said discharge opening of said air blast tube.

16. The fuel injection system of claim 15 wherein said pin includes said fuel supply tube defining said fuel passageway therewithin and extending from said pin to extend into said fuel supply entry tube, and including a finger formed integrally with said fuel supply entry tube to face said fuel supply tube to produce a fuel spray directed into the path of compressed air discharged through said air blast tube.

17. The fuel injection system of claim 1 wherein said turbine engine includes a combustor case spaced from said wall of said combustor, said fuel supply tube defining a fuel supply passage and having said fuel supply orifice therein, said fuel supply tube extending to said point internally of said air blast tube but adjacent said discharge opening thereof.

18. The fuel injection system of claim 17 wherein said combustor case includes means for securing said fuel supply tube thereto, said fuel supply tube extending from said combustor case into said air blast tube generally axially of said air blast tube to a point adjacent said discharge opening thereof, said air blast tube including means for supporting said fuel supply tube at an axially remote location from said combustor case.

19. The fuel injection system of claim 18 wherein said axially remote supporting means includes a centering tube supported by a strut along the centerline of said air blast tube, said fuel supply tube being disposed within said centering tube in sliding relationship thereto, and including means for maximizing the distance between said centering tube and said securing means to minimize stress on said fuel supply tube.

20. The fuel injection system of claim 19 wherein said distance maximizing means includes a recess in said combustor case axially of said air blast tube, said securing means being associated with said recess in said combustor case axially remote from said air blast tube, said centering tube being disposed within said air blast tube axially remote from said securing means associated with said recess in said combustor case.

21. The fuel injection system of claim 17 wherein said fuel supply tube extends into said air blast tube generally axially of said air blast tube to a point adjacent said discharge opening thereof, and including impingement surface means positioned in the path of fuel discharged from said fuel supply tube to produce a fuel spray directed into the path of compressed air discharged through said discharge opening of said air blast tube.

22. The fuel injection system of claim 21 wherein said fuel supply tube terminates on the centerline of said air blast tube at a point at or near said discharge opening of said air blast tube and said impingement surface means includes a finger facing said fuel supply tube to produce a fuel spray directed into the path of compressed air at an acute angle up to approximately 90 degrees.

23. The fuel injection system of claim 18 wherein said supporting means includes a centering tube supported by a strut along the centerline of said air blast tube, said fuel supply tube being disposed within said centering tube in sliding relationship thereto, and including a finger formed integrally with said centering tube to face said fuel supply tube to produce a fuel spray directed into the path of compressed air.

24. A fuel injection system for a combustor of a turbine engine, comprising:

an air blast tube mounted at an acute angle relative to a wall of said combustor, said air blast tube having a first end in communication with said combustor and a second, enlarged end disposed at an acute angle to an axis of said air blast tube and in communication with a source of compressed air externally of said wall of said combustor, said air blast tube being operable to deliver compressed air from said source into said combustor;

fuel supply means including a fuel supply tube for delivering fuel through a fuel supply orifice positioned at a point adjacent said first end of said air blast tube, at least a portion of said fuel supply tube being positioned within and extending through at last a portion of said air blast tube such that said fuel supply tube has a first end defining said fuel supply orifice positioned substantially at said first end of said air blast tube so as to be in communication with said combustor through said fuel supply orifice and said fuel supply tube also having a second end in communication with a source of fuel externally of said wall of said combustor, said fuel supply tube thereby extending to a point communicating first end thereof;

said discharge opening of said air blast tube lying in a plane disposed generally perpendicular to an axis of said air blast tube and intersecting said wall of said combustor, said fuel supply means including a fuel supply passage defined by said fuel supply tube having said fuel supply orifice therein;

said air blast tube having a generally cylindrical wall disposed at said acute angle to said wall of said combustor, said air blast tue being secured to said wall of said combustor and having an opening through said generally cylindrical wall thereof, said fuel supply tube extending at least into said generally cylindrical wall of said air blast tube; and impingement surface means positioned in the path of fuel discharged from said fuel supply means to produce a fuel spray directed into the path of compressed air discharged through said discharge opening of said air blast tube at a point internally of said air blast tube to cause said fuel spray and compressed air to interact within said combustor to produce an atomized fuel/air mixture.

25. The fuel injection system of claim 24 wherein said discharge opening of said air blast tube has an outermost point adjacent said wall of said combustor and an innermost point diametrically opposite said outermost point thereof and said opening through said generally cylindrical wall is axially spaced relative to said outermost point of said discharge opening of said air blast tube.

26. The fuel injection system of claim 25 wherein said generally cylindrical wall of said air blast tube includes a fuel supply entry tube leading to said opening through said generally cylindrical wall of said air blast tube, said fuel supply entry tube being dimensioned slightly larger than said fuel supply tube to provide an air gap to facilitate insertion of said fuel supply tube into said fuel supply entry tube.

27. The fuel injection system of claim 26 wherein said fuel supply tube terminates at said generally cylindrical wall of said air blast tube in closely spaced relation to said outermost point of said discharge opening of said air blast tube and including a finger facing said fuel supply tube to produce a fuel spray directed into the path of compressed air discharged through said discharge opening of said air blast tube.

28. The fuel injection system of claim 26 wherein said fuel supply tube terminates at the centerline of said air blast tube at or near said outermost point of said discharge opening of said air blast tube and including a finger facing said fuel supply tube to produce a fuel spray directed into the path of compressed air discharged through said discharge opening of said air blast tube.

29. The fuel injection system of claim 28 wherein said fuel supply tube is scarfed at the centerline of said air blast tube, said fuel supply orifice being disposed within said fuel supply tube at a point upstream of the point where said fuel supply tube is scarfed, said fuel supply tube being scarfed to form a terminal end generally coinciding with the centerline of said air blast tube.

30. The fuel injection system of claim 28 wherein said first end of said air blast tube at said discharge opening has a wake reducing constriction in said generally cylindrical wall at a position inwardly of said combustor and said second end of said air blast tube has a compressed air receiving outward flare in said generally cylindrical wall at a position outwardly of said combustor.

31. The fuel injection system of claim 25 wherein said generally cylindrical wall of said air blast tube includes a fuel supply entry tube leading through said opening in said generally cylindrical wall of said air blast tube, said fuel supply entry tube being dimensioned slightly larger than said fuel supply tube to provide an air gap to facilitate insertion of said fuel supply tube into said fuel supply entry tube.

32. The fuel injection system of claim 31 wherein said fuel supply entry tube terminates at or near the centerline of said air blast tube at or near said outermost point of said discharge opening of said air blast tube and including a finger formed integrally with said fuel supply entry tube to face said fuel supply tube to produce a fuel spray directed into the path of compressed air discharged through said air blast tube.

33. A fuel injection system for a combustor of a turbine engine, comprising:

an air blast tube mounted at an acute angle relative to a wall of said combustor, said air blast tube having a first end in communication with said combustor and a second, enlarged end disposed at an acute angle to an axis of said air blast tube and in communication with a source of compressed air externally of said wall of said combustor, said air blast tube being operable to deliver compressed air from said source into said combustor; and fuel supply means including a fuel supply tube for delivering fuel through a fuel supply orifice positioned adjacent said first end of said air blast tube, at least a portion of said fuel supply tue being positioned within and extending through at least a portion of said air blast tube such that said fuel supply tube has a first end defining said fuel supply orifice positioned substantially at said first end of said air blast tube so as to be in communication with said combustor through said fuel supply orifice and said fuel supply tube also having a second end in communication with a source of fuel externally of said wall of said combustor, said fuel supply tube thereby extending to a point communicating internally with said air blast tube but adjacent or near a discharge opening of said air blast tube;

said air blast tube having a generally cylindrical wall disposed at said acute angle to said wall of said combustor, said air blast tue being secured to said wall of said combustor and having an opening through said generally cylindrical wall thereof, said fuel supply tube extending at least into said generally cylindrical wall of said air blast tube; and said turbine engine having a combustor case spaced from said wall of said combustor together with at least one locating boss secured to said wall of said combustor adjacent said air blast tube, said turbine engine further including a pin extending from said locating boss and secured to said combustor case for connecting said combustor case to said wall of said combustor, said pin being formed to have a fuel passageway comprising said fuel supply tube, said locating boss surrounding said opening in said generally cylindrical wall of said air blast tue and said pin extending through said locating boss.

34. The fuel injection system of claim 33 wherein said discharge opening of said air blast tube lies in a plane disposed generally perpendicular to an axis of said air blast tube and intersecting said wall of said combustor, said fuel supply tube defining a fuel supply passage and having said fuel supply orifice therein, said fuel supply tube extending to said point communicating internally with said air blast tube but adjacent or near said discharge opening thereof.

35. The fuel injection system of claim 33 including impingement surface means positioned in the path of fuel discharged through said fuel supply orifice to produce a fuel spray directed into the path of compressed air discharged through said discharge opening of said air blast tube at a point internally of said air blast tube to cause said fuel spray and compressed air to interact within said combustor to produce an atomized fuel/air mixture.

36. The fuel injection system of claim 33 wherein said generally cylindrical wall of said air blast tube includes a fuel supply entry tube leading through said opening in said generally cylindrical wall of said air blast tube, said fuel supply entry tube terminating at or near the centerline of said air blast tube at or near said outermost point of said discharge opening of said air blast tube.

37. The fuel injection system of claim 36 wherein said pin includes said fuel supply tube defining said fuel passageway therewithin and extending from said pin to extend into said fuel supply entry tube, and including a finger formed integrally with said fuel supply entry tube to face said fuel supply tube to produce a fuel spray directed into the path of compressed air discharged through said air blast tube.

38. A fuel injection system for a combustor of a turbine engine, comprising:

an air blast tube mounted at an acute angle relative to a wall of said combustor, said air blast tube having a first end in communication with said combustor and a second, enlarged end disposed at an acute angle to an axis of said air blast tube and in communication with a source of compressed air externally of said wall of said combustor, said air blast tube being operable to deliver compressed air from said source into said combustor; and fuel supply means including a fuel supply tube for delivering fuel through a fuel supply orifice positioned adjacent said first end of said air blast tube, at least a portion of said fuel supply tube being positioned within and extending through at least a portion of said air blast tube such that said fuel supply tube has a first end in communication with said combustor through said fuel supply orifice and said fuel supply tube also having a second end in communication with a source of fuel externally of said wall of said combustor, said fuel supply tube thereby extending to a point communicating internally with said air blast tube but adjacent or near a discharge opening of said air blast tube;

said air blast tube having a generally cylindrical wall disposed at said acute angle to said wall of said combustor and being secured to said wall of said combustor;

said turbine engine having a combustor case spaced from said wall of said combustor and said fuel supply tube having a fuel supply passage, said fuel supply tube also extending to said point communicating internally with said air blast tube but adjacent or near said discharge opening thereof;

said combustor case including means for securing said fuel supply tube thereto, said fuel supply tube extending from said combustor case into said air blast tube generally axially of said air blast tube to a point adjacent said discharge opening thereof, said air blast tube including means for supporting said fuel supply tube at an axially remote location from said combustor case.

39. The fuel injection system of claim 38 wherein said supporting means includes a centering tube supported by a strut along the centerline of said air blast tube, said fuel supply tube being disposed within said centering tube in sliding relationship thereto, and including means for maximizing the distance between said centering tube and said securing means to minimize stress on said fuel supply tube.

40. The fuel injection system of claim 39 wherein said distance maximizing means includes a recess in said combustor case axially of said air blast tube, said securing means being disposed within said recess in said combustor case axially remote from said air blast tube, said centering tube being disposed within said air blast tube axially remote from said securing means and said recess in said combustor case.

41. The fuel injection system of claim 38 wherein said fuel supply tube extends into said air blast tube generally axially of said air blast tube to a point adjacent said discharge opening thereof, and including impingement surface means positioned in the path of fuel discharged from said fuel supply tube to produce a fuel spray directed into the path of compressed air discharged through said discharge opening of said air blast tube.

42. The fuel injection system of claim 41 wherein said fuel supply tube terminates on the centerline of said air blast tube at a point at or near said discharge opening of said air blast tube and said impingement surface means includes a finger facing said fuel supply tube to produce a fuel spray directed into the path of compressed air at an acute angle up to approximately 90 degrees.

43. The fuel injection system of claim 38 wherein said supporting means includes a centering tube supported by a strut along the centerline of said air blast tube, said fuel supply tube being disposed within said centering tube in sliding relationship thereto, and including a finger formed integrally with said centering tube to face said fuel supply tube to produce a fuel spray directed into the path of compressed air.

* * * * *